(12) United States Patent     (10) Patent No.:   US 12,664,354 B2

Richman et al.     (45) Date of Patent:     Jun. 23, 2026

(54) SYSTEM AND GRAPHICAL USER INTERFACE FOR DOCUMENT EDITING AND PUBLICATION CONTROL

(71) Applicant: Atlassian Pty Ltd., Sydney (AU)

(72) Inventors: Fletcher Richman, San Diego, CA (US); Venkatram Ramanathan, San Jose, CA (US); Samuel Lucas, Bozeman, MT (US); Alexander Knight, Sydney (AU); Rick Messer, Austin, TX (US)

(73) Assignee: ATLASSIAN PTY LTD., Sydney (AU)

( * ) Notice: Subject to any disclaimer, the term of this patent is extended or adjusted under 35 U.S.C. 154(b) by 235 days.

(21) Appl. No.: 18/399,591

(22) Filed: Dec. 28, 2023

(65) Prior Publication Data

US 2025/0217577 A1     Jul. 3, 2025

(51) Int. Cl.
G06F 40/166     (2020.01)
G06F 3/0482     (2013.01)
G06F 40/106     (2020.01)

(52) U.S. Cl.
CPC .......... G06F 40/166 (2020.01); G06F 3/0482 (2013.01); G06F 40/106 (2020.01)

(58) Field of Classification Search
CPC ..... G06F 40/166; G06F 3/0482; G06F 40/106
See application file for complete search history.

(56) References Cited

U.S. PATENT DOCUMENTS

| | | | |
|---|---|---|---|
| 2006/0080432 A1* | 4/2006 | Spataro | H04L 12/1831 |
| | | | 709/224 |
| 2020/0036860 A1* | 1/2020 | Takahashi | H04N 1/0044 |
| 2024/0111399 A1* | 4/2024 | Chung | G06F 40/14 |
| 2024/0220082 A1* | 7/2024 | Katta | G06F 16/906 |

* cited by examiner

*Primary Examiner* — Cao H Nguyen

(74) *Attorney, Agent, or Firm* — Brownstein Hyatt Farber Schreck, LLP

(57) ABSTRACT

A method may include causing a client computer to display a graphical user interface including a content panel configured to display a selected document in a publication-controlled editing mode and in a synchronous editing mode and a navigational panel including a hierarchical element tree. The method may further include, in response to a selection, from a first user, of a selectable element in the hierarchical element tree, causing the document to be displayed in the content panel in the synchronous editing mode. The method may further include, in response to receiving from the first user a request to edit the document in the publication-controlled editing mode, causing the document to be displayed in the content panel in the publication-controlled editing mode.

20 Claims, 12 Drawing Sheets

SYSTEM AND GRAPHICAL USER INTERFACE FOR DOCUMENT EDITING AND PUBLICATION CONTROL

TECHNICAL FIELD

The present disclosure is generally directed to a content collaboration system, and more particularly, to systems and methods for providing different schemes for editing and publishing shared documents in a content collaboration system.

BACKGROUND

Modern electronic devices facilitate a myriad of uses, both for business and personal endeavors. For example, electronic devices like personal computers, tablets, and mobile phones, are used in both business and personal contexts for creating and storing documents, writing computer code, communicating with other individuals (e.g., via email, chat services, voice and video calls), and the like. Some modern enterprises use software systems to manage various digital items that are used for product development or other professional activities. For example, content collaboration systems may facilitate the creation, presentation, and management of user-generated documents.

SUMMARY

A method may include, in a content collaboration system including a plurality of user-generated documents, causing a client computer to display a graphical user interface including a content panel configured to display a selected document in a publication-controlled editing mode and in a synchronous editing mode, and a navigational panel including a hierarchical element tree, the hierarchical element tree including a plurality of hierarchically arranged selectable elements, each respective selectable element being selectable to cause display of a respective document associated with the respective selectable element in the content panel. The method may further include, in response to a selection, from a first user, of a selectable element in the hierarchical element tree, causing a document to be displayed in the content panel in the synchronous editing mode, while the document is displayed in the content panel in the synchronous editing mode and in response to receiving, from the first user, a first edit to the document, causing the document with the first edit to be displayed, in real time, to a second user. The method may further include, in response to receiving, from the first user, a request to edit the document in the publication-controlled editing mode, causing the document to be displayed in the content panel in the publication-controlled editing mode, and while the document is displayed in the content panel in the publication-controlled editing mode receiving, from the first user, a second edit to the document, and causing the document to be displayed to the second user without the second edit.

The method may further include, while the document is displayed in the content panel in the publication-controlled editing mode, receiving a publication request from the first user, and in response to receiving the publication request, causing the document with the first edit to be displayed to the second user.

The method may further include, while the document is displayed in the content panel in the publication 0-controlled editing mode receiving, from a third user, a third edit to the document, and causing the document to be displayed to the second user without the third edit.

The method may further include, while the document is displayed in the content panel in the synchronous editing mode and in response to the first edit including an identifier of a third user, providing a notification to the third user.

The method may further include, in response to receiving a publication request for the document, providing, to a third user, a notification indicating that the document has been edited.

The client computer may be a first client computer, the content panel may be a first content panel, causing the document to be displayed to the second user without the second edit may include causing the document to be displayed in a second content panel of a second client computer, and the method may further include, while the document is displayed in the first content panel in the publication-controlled editing mode, receiving a selection from the second user to edit the document in the publication-controlled editing mode, and in response to receiving the selection from the second user to edit the document in the publication-controlled editing mode causing the document to be displayed in the second content panel in the publication-controlled editing mode, and causing the document with the second edit to be displayed to the second user. The method may further include, while the document is displayed in the second content panel in the publication-controlled editing mode receiving, from the second user, a third edit to the document, and causing the document with the third edit to be displayed, in real time, to the first user.

A method may include, in a content collaboration system including a plurality of user-generated documents, causing a client computer to display a graphical user interface including a content panel configured to display a selected document in a publication-controlled editing mode and in a synchronous editing mode, and a navigational panel including a hierarchical element tree, the hierarchical element tree including a plurality of hierarchically arranged selectable elements, each respective selectable element being selectable to cause display of a respective document associated with the respective selectable element in the content panel. The method may further include, in response to a selection, from a first user, of a selectable element in the hierarchical element tree, causing a document to be displayed in the content panel in a synchronous editing mode in which the document is editable by the first user and a second user, edits from the first user are visible, in real time, to the second user, and edits from the second user are visible, in real time, to the first user. The method may further include, in response to receiving, from the first user, a request to edit the document in the publication-controlled editing mode, causing the document to be displayed in the content panel in the publication-controlled editing mode in which the document is editable by the first user, and edits from the first user are not visible to the second user until after a publication request is received from the first user, and in response to receiving the publication request from the first user, the edits from the first user are visible to the second user.

The method may further include, in response to receiving the publication request, providing, to a third user, a notification indicating that the document has been edited. The notification may be a first notification, and the method may further include, in response to receiving a first edit from the first user while the document is displayed in the synchronous editing mode, the first edit including a user identifier of a fourth user, providing a second notification to the fourth user. The notification may be a first notification, and the method may further include receiving a first edit from the first user while the document is displayed in the synchronous editing mode, and after a predetermined time period since receiving the first edit, providing, to the third user, a second notification indicating that the document has been edited.

The synchronous editing mode may be a default editing mode for documents in the content collaboration system. The client computer may be a first client computer, the content panel may be a first content panel, and the method may further include, while the document is displayed in the first content panel in the publication-controlled editing mode and prior to receiving the publication request, receiving a selection from the second user to edit the document in the publication-controlled editing mode, and in response to receiving the selection from the second user to edit the document in the publication-controlled editing mode causing the document to be displayed to the second user in a second content panel of a second client computer in the publication-controlled editing mode, and causing the document with edits from the first user to be displayed to the second user.

In the publication-controlled editing mode the document may be editable by a plurality of additional users, edits from the first user and from the plurality of additional users may be visible, in real time, to the first user and to the plurality of additional users, and the edits from the first user and from the plurality of additional users may be not visible to the second user until after the publication request is received from the first user.

A computer system may include at least one processor, and at least one memory storing instructions, which when executed by the at least one processor, cause the at least one processor to perform operations including causing a client computer to display a graphical user interface including a content panel configured to display a selected document in a publication-controlled editing mode and in a synchronous editing mode, and a navigational panel including a hierarchical element tree, the hierarchical element tree including a plurality of hierarchically arranged selectable elements, each respective selectable element being selectable to cause display of a respective document associated with the respective selectable element in the content panel. The operations may further include, in response to a selection, from a first user, of a selectable element in the hierarchical element tree, causing the document to be displayed in the content panel in the synchronous editing mode, while the document is displayed in the content panel in the synchronous editing mode and in response to receiving, from the first user, a first edit to the document, causing the document with the first edit to be displayed, in real time, to a second user. The operations may further include, in response to receiving, from the first user, a request to edit the document in the publication-controlled editing mode, causing the document to be displayed in the content panel in the publication-controlled editing mode, and while the document is displayed in the content panel in the publication-controlled editing mode receiving, from the first user, a second edit to the document, and causing the document to be displayed to the second user without the second edit.

The operations may further include, while the document is displayed in the content panel in the publication-controlled editing mode, receiving a publication request from the first user, and in response to receiving the publication request, causing the document with the first edit to be displayed to the second user.

The operations may further include, while the document is displayed in the content panel in the publication-controlled editing mode receiving, from a third user, a third edit to the document, and causing the document to be displayed to the second user without the third edit.

The operations may further include, while the document is displayed in the content panel in the synchronous editing mode and in response to the first edit including an identifier of a third user, providing a notification to the third user.

The operations may further include, in response to receiving a publication request for the document, providing, to a third user, a notification indicating that the document has been edited.

The client computer may be a first client computer, the content panel may be a first content panel, causing the document to be displayed to the second user without the second edit may include causing the document to be displayed in a second content panel of a second client computer, and the operations may further include, while the document is displayed in the first content panel in the publication-controlled editing mode, receiving a selection from the second user to edit the document in the publication-controlled editing mode, and in response to receiving the selection from the second user to edit the document in the publication-controlled editing mode causing the document to be displayed in the second content panel in the publication-controlled editing mode, and causing the document with the second edit to be displayed to the second user.

Figure 1A:
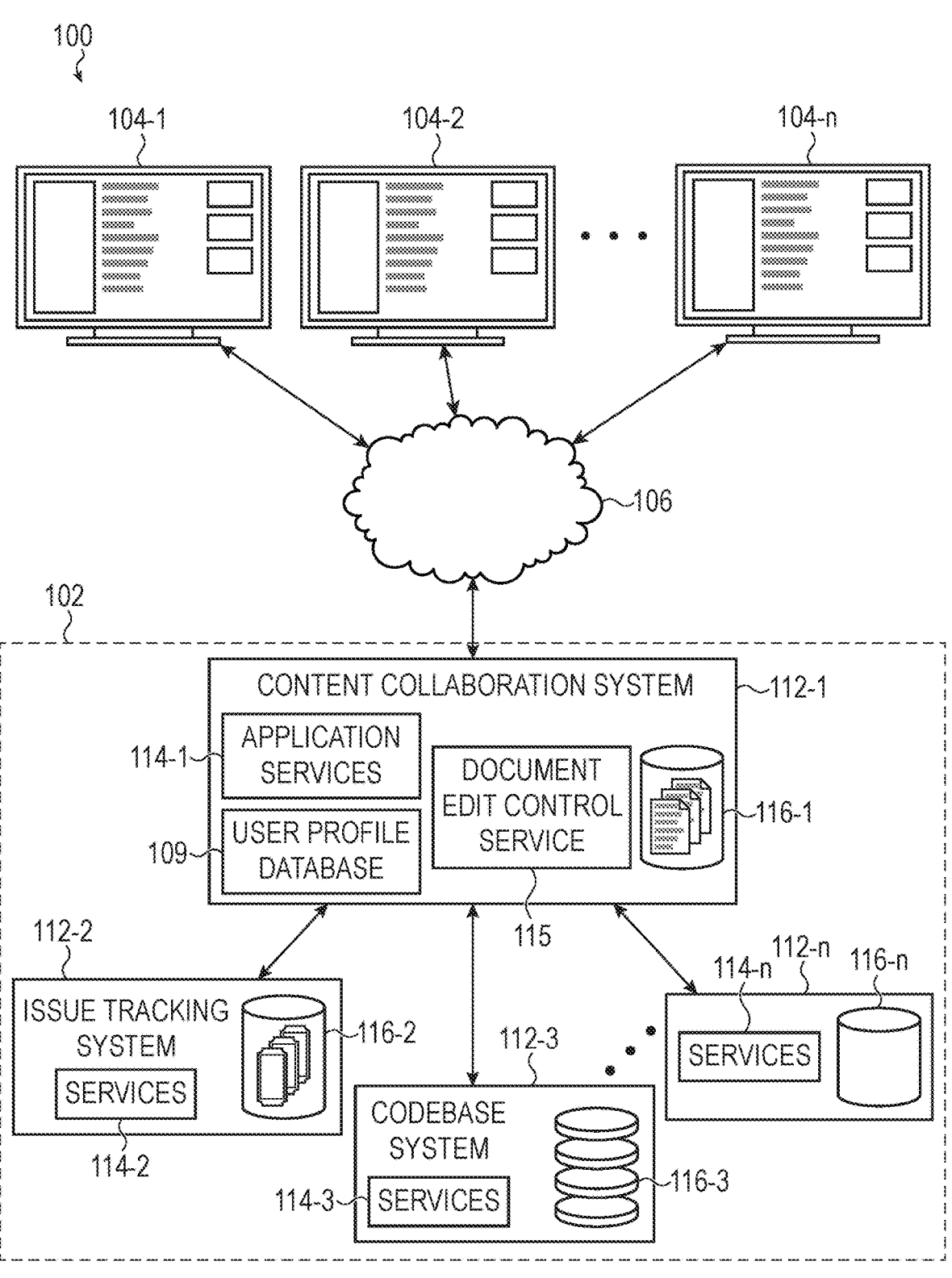
FIG. 1A depicts an example networked computer system in which various features of the present disclosure may be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION OF THE EMBODIMENTS

In the following description numerous specific details are set forth in order to provide a thorough understanding of the claims. It will be apparent, however, that the claims may be practiced without these specific details. In some instances, well-known structures and devices are shown in block diagram form in order to avoid unnecessary obscuring.

The systems and techniques described herein are directed to a content collaboration system that allows users to create and publish electronic content using a client application. In particular, the systems and techniques described herein may be applicable to content collaboration platforms that use a web browser client application to generate graphical user interfaces that facilitate the creation, editing, and viewing of electronic content (e.g., electronic documents). For example, a user may create a document, and then edit, view, share, or perform other operations on the document in the content collaboration system. Additionally, other users that have suitable permissions can edit, view, or perform other operations on the same document.

The content collaboration system may facilitate multiple different collaborative editing modes in order to provide a tailored user experience for many different users. For example, the content collaboration system may provide both a synchronous editing mode and a publication-controlled editing mode. In a synchronous editing mode, users (who have appropriate permissions) can directly edit a document that is displayed in a content panel of the graphical user interface, and in which the edits are visible, in real time, to all of the viewers of the document. This mode provides a fast, efficient, and intuitive interface for editing documents in the content collaboration system. However, in some cases, it may be preferable that a user's edits are not propagated, in real-time, to all viewers of the document. Accordingly, the content collaboration system also provides a publication-controlled editing mode in which a user's edits are only propagated for general viewing in response to an explicit instruction to publish the document. By providing both synchronous and publication-controlled editing modes, the content collaboration system can provide comprehensive document creation and editing schemes, while also accommodating a variety of use cases and user preferences.

In some cases, the publication-controlled editing mode may also allow real-time edits to be displayed to a subset of users who explicitly choose to enter into a publication-controlled editing session for a given document. For example, a first user may choose to edit a document in a publication-controlled editing mode, in which case the first user's edits are not visible to the general user base until the document is published. A second user, however, may also wish to edit the document while it is in the publication-controlled editing mode. The second user may thus enter the publication-controlled editing session for that document, in which the edits of the first and second user are shown, in real-time, to each other, while still being hidden from the general user base. This allows the collaborative and real-time edit functionality of the synchronous editing mode to be available even in the context of a publication-controlled editing session, where the general user base is not able to see the edits in real time. This may be particularly advantageous where a team of users is working on a document, but only wants the document to be published to wider audience when the edits are complete.

Also described herein are techniques for executing other document or content functions in both the synchronous and publication-controlled editing modes. For example, certain document or content functions (e.g., notifying other users that the document has been edited, updating document metadata, etc.) may be initiated upon publication of the document when the document is in the publication-controlled editing mode. However, in the synchronous editing mode, no such publication event occurs. Accordingly, the content collaboration system may execute such functions in other ways, such as periodically, or after the document has not been edited for a predetermined time, or the like. These and other features of a content collaboration system are described herein. While certain example application environments are used to illustrate the features of the content collaboration system, these are provided for example purposes only.

FIG. 1A depicts an example networked computer system 100 (or simply "system 100") in which the techniques described herein may be employed. The system 100 includes an application platform 102, associated software applications 112 (e.g., 112-1, . . . , 112-n), and client devices 104 (104-1, . . . , 104-n) that communicate via a network 106 (e.g., the Internet). The client devices 104 may be any suitable type of device, including but not limited to a desktop or laptop computer, tablet computer, mobile phone, personal digital assistant, smart device, voice-based digital assistant, or the like.

The application platform 102, also referred to herein as hosted services or host servers, may be or may include one or more servers, content stores (e.g., databases), communications systems, data structures, programs, or other components, systems, or subsystems that provide services described herein. The application platform 102 may also be referred to herein as hosted services, which may be provided by one or more host servers or other hardware elements of the system 100. The application platform 102 may include one or more software applications 112 (e.g., 112-1, . . . , 112-n). The one or more software applications 112 provide content and content services to users of the system 100, as described herein. For example, the content collaboration system 112-1 may allow users (e.g., via graphical user interfaces displayed on clients 104) to create, edit, view, and/or otherwise interact with system content, such as user-generated documents.

The software applications 112 may include application services 114 (e.g., 114-1, . . . , 114-n) and data stores 116 (e.g., 116-1, . . . , 116-n). Application services 114 may facilitate the creation, deletion, management, editing, serving, and/or other services related to the content and/or content items (e.g., documents) associated with that software application and stored in the data store 116. Data stores 116 may be databases or other data storage resources that store documents, content items, and/or other data related to a software application 112.

As described herein, the first software application 112-1 may be a content collaboration system or platform. The content collaboration system may allow users (e.g., via clients 104) to create, modify (e.g., edit), view, and/or otherwise interact with system content. User-generated content (e.g., content created by or designated by system users) is generally organized in what is referred to herein as a document space (or simply a space). Generally, a document space includes a set of documents (or other content items)

having a hierarchical relationship to each other as designated by (or reflected by) a hierarchical document or element tree. Document spaces may include other content including a calendar, a space home page or overview, a space calendar, and other space-specific content. Document spaces may also include in-line comments, comment sections for each document or page, and other content that is adapted to receive and collect user feedback. Further, each document space designates at least one space administrator, which identifies a user account on the system having administrator authority and permissions. Specifically, a user account designated as a space administrator is granted the permission to set permissions for space-specific content including the set of documents (or pages), the set of blog entries, calendar entries, space overview, and other space content with respect to other system users. While there may be more than one space administrator, the authority to set permissions for a given space is generally not exceeded by another system user other than a tenant-level administrator or other special user account. In many cases, the space administrator is the creator or author of the document space.

The space content including electronic documents, electronic pages, blog posts, calendar entries and other content may be stored in the data store 116-1. User-generated content may include content such as text, images, graphics, tables, or the like. Documents may be linked or otherwise related to one another in a document hierarchy as designated by a hierarchical element tree (e.g., a document tree or a page tree). Documents (e.g., user-generated documents) may be stored in the data store 116-1 as discrete files, data structures, or other digital objects. The data store 116-1 may be a centralized or single physical data storage medium or, alternatively, may be distributed across physical memory managed by multiple devices.

The application services 114-1 of the content collaboration system 112-1 may facilitate content services related to the documents, including causing user interfaces of the content collaboration system 112-1 to be displayed to a user on a client 104, receiving user inputs relating to the creation and/or modification of documents, and the like.

The content collaboration system 112-1 may also include a document edit control service 115. The document edit control service 115 of the content collaboration system 112-1 may provide various functions for the operation of the synchronous editing mode and publication-controlled editing mode. For example, the document edit control service 115 may store edit state information related to each document, indicating whether it is in a synchronous editing mode or publication-controlled editing mode (or other mode). This information may be used to determine how different client devices may access and/or view the document and edits to the document. The document edit control service 115 may also interface with the data store 116-1 to access documents, create working copies of the documents, modify documents based on received edits, and the like.

The document edit control service 115 may also cooperate with the user profile database 109 to determine, based on document and/or user permissions, how particular users may interact with particular documents. For example, as described herein, if a user requests to initiate or join a publication-controlled editing session, the document edit control service 115 may determine whether the user is authorized to do so. As another example, the document edit control service 115 may determine if a user is authorized to edit a document that is in a synchronous editing mode.

The document edit control service 115 may also perform various functions related to receiving edits from users and managing how the received edits are stored, how the received edits are served to the various client devices that are viewing the document, and the like. These and other functions may also depend at least in part on the edit mode associated with a particular document. For example, for documents that are being edited in a synchronous editing mode, the document edit control service 115 may receive edits, perform any necessary deconfliction of edits based on edit timestamps, store the edits in the document (in the data store 116-1), and cause the edits (e.g., the document with the edits) to be displayed, in real time, to each user who is viewing the document. For documents that are being edited in a publication-controlled editing mode, the document edit control service 115 may create and/or store a static version of the document, and cause the static version of the document to be displayed to users who are not participating in the publication-controlled editing of the document. Additionally, the document edit control service 115 may receive edits from users who are participating in the publication-controlled editing session, store the edits in the document (in the data store 116-1), and optionally cause the edits (e.g., the document with the edits) to be displayed in real time to other user who are participating in the publication-controlled editing session. Upon receiving a publication request for the document, the document edit control service 115 may cease serving the static version of the document to users, and may instead cause the published document to be generally available to authorized users.

In some cases, the document edit control service 115 may determine when certain actions or operations that are related to document edits may be initiated. For example, upon receiving a publication request for a document, the document edit control service 115 may initiate certain operations such as notifying users that the document has been edited, notifying users that they were mentioned in the document, updating document metadata, performing document storage operations, and the like. For documents in a synchronous editing mode, the document edit control service 115 may initiate such actions periodically, after the expiry of predetermined durations, or in response to other conditions.

While the document edit control service 115 is shown as a distinct service within the content collaboration system 112-1, this is merely for illustration. In implementations, the document edit control service 115 may be a service provided by the application services 114-1, the data store 116-1, or another service or application of the system 102.

The content collaboration system 112-1 may also include a user profile database 109. The user profile database 109 may store and maintain user profiles about users of the system 100. User profiles may include numerous types of information about the users of the system, including but not limited to names, departments, permissions (e.g., for editing, viewing, creating, deleting documents or other content items), job titles, roles, content with which they are associated (e.g., documents, issue tickets, messages, etc.), team and/or project associations, relative position in a hierarchy in an organization or entity, or the like. The event service 110 may use the information in the user-profile database to determine what events should be included in a user's event log. The user profile database 109 may also be shared with other software applications 112 in the system 100, and may in some cases be instantiated as a separate software application that is accessible by the other software applications in the system 100.

A second software application 112-2 may be an issue tracking system that tracks issues via issue tickets, which may be stored in the data store 116-2. Issue tickets may include content, such as a user-generated description of an issue, issue status (e.g., closed, open, awaiting review), user assignments, issue ticket urgency, issue ticket age, and the like. In some cases, issue tickets may include user-generated specifications of issues in computer code of software products.

Issue tickets (also referred to as "issues" or "tickets," separately) may be stored in the data store 116-2 as files, data structures, or the like. The application services 114-2 of the issue tracking system may facilitate content services related to the issue tickets, including causing user interfaces of the issue tracking system to be displayed to a user on a client 104, receiving user inputs relating to the creation and/or modification of issue tickets (e.g., changing status, receiving content related to the issue and/or issue resolution, etc.), changes to issue status, changes to user assignments, and the like.

A third software application 112-3 may be a codebase system that provides services related to creating, developing, maintaining, and/or deploying software code. The third software application may include, for example, a source code management system (SCM system), deployment management system, or other system configured to manage the storage, revision, and/or deployment of software products. Software code and other data associated with the third software application 112-3 may be stored in codebases 116-3. In some cases, code for distinct software programs, environments, platforms, or the like, may be stored in or as distinct codebases 116-3. Distinct codebases may be stored in different databases or data stores, or they may share one or more databases or data stores.

The application platform 102 may include one or more authorization services or authorization servers that are used to authenticate system users (accessing the system through client devices 104. Once authenticated, the users may be granted access to one or more of the respective software applications, platforms, and system content in accordance with a permissions scheme or profile stored with respect to each registered user account, which may be stored by or managed by a user profile database of the application platform 102. Each application may have a discrete or separate authorization service or system, or applications may share or leverage a common authorization service or server. In one example, the application platform 102 provides a unified authentication service by verifying access from a permitted user and pairing the verified user with a corresponding user account in one or more of the software platforms. As one non-limiting example, the authorization service or server may use a shared cookie/scheme to authenticate each user account on each software application or platform. As another non-limiting example, the authorization service or server may authenticate users with a single sign-on service (SSO) and/or a two-factor authentication (2FA) service.

While the document edit control service 115 and the document editing modes are described herein, by way of example, with respect to the content collaboration system and user-generated documents, the same or similar functions may be provided for or by the other software applications 112 described herein. For example, issue records in an issue tracking system 112-2 may be editable in synchronous and publication-controlled editing modes, and content in a codebase system 112-3 may be editable in synchronous and publication-controlled editing modes. In such cases, the software applications 112 may implement the same and/or similar techniques and systems that are described herein with reference to the content collaboration system 112-1.

Figure 1B:
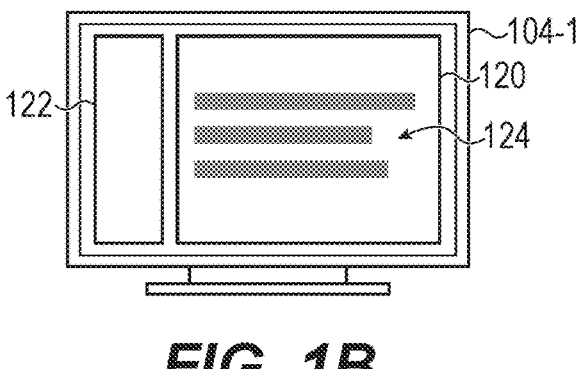
FIG. 1B depicts an example client device.

FIG. 1B illustrates a client 104-1. The client 104-1 is displaying a graphical user interface of the content collaboration system 112-1, which may include a content panel 120 and a navigational panel 122. As described herein, the navigational panel 122 may include a hierarchical element tree that includes a plurality of hierarchically arranged selectable elements, each respective selectable element being selectable to cause display of a respective document associated with the respective selectable element in the content panel 120. The content panel 120 may be configured to display a selected document (e.g., document 124) to a user of the client 104-1. The content panel 120 may also allow users to edit and otherwise interact with the documents that are displayed therein. For example, a user may enter or delete text, images, videos, links, tables, or other document content directly into a displayed document via the content panel 120. As described herein, the content panel 120 may support both synchronous and publication-controlled editing modes in the same content panel 120, thus providing a seamless and uniform experience in multiple editing modes.

Figure 1C:
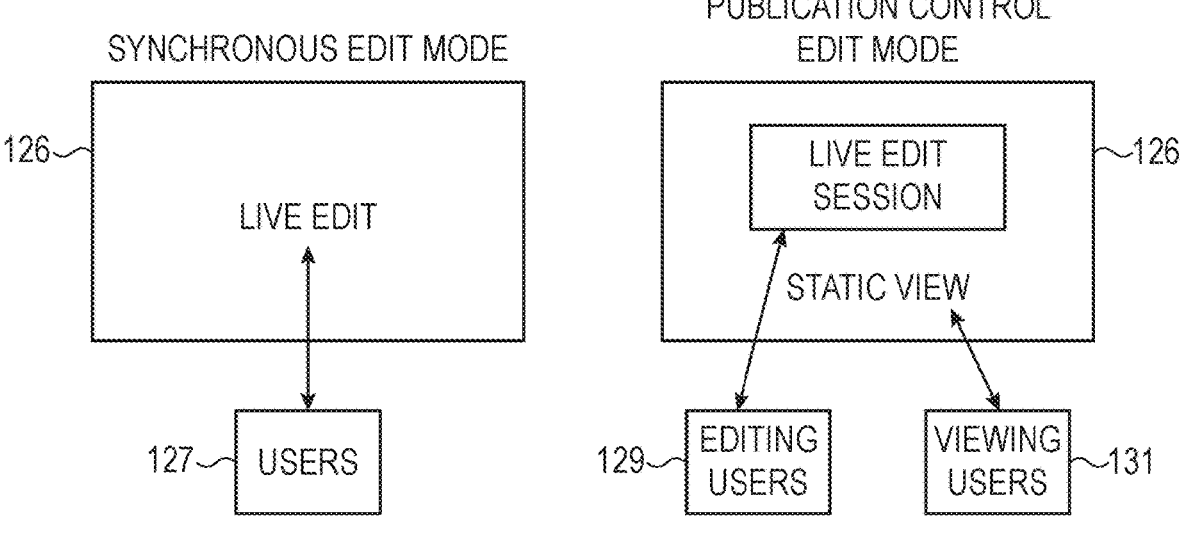
FIG. 1C depicts a schematic view of a document in a synchronous editing mode and in a publication-controlled editing mode.

As described herein, documents may be viewed and interacted with, from the content panel 120 of the graphical user interface, in both a synchronous editing mode and a publication-controlled editing mode. FIG. 1C illustrates a schematic view of the document 126 in a synchronous editing mode and in a publication-controlled editing mode, illustrating how different sets of users may interact with the document based on the particular editing mode. In the synchronous editing mode, the document 126 may be edited live by all users who have the proper permissions and/or authorizations to view/edit the document 126. In this mode, all of the edits to the document are viewable, in real time, to all of the users 127.

In the publication-controlled editing mode, which may be initiated by one of the users 127 affirmatively selecting a publication-controlled editing session for the document 126, the document 126 may be understood as having a live edit version and a static view version. A first subset of one or more editing users 129 may participate in a live edit session (e.g., a publication-controlled edit session) of the document, in which the edits from each editing user 129 are visible, in real time, to each other editing user 129. Viewing users 131, however, do not see the edits from the live edit session. Rather, they view a static version of the document 126, corresponding to the document 126 when the publication-controlled editing session was initiated. As described herein, a viewing user 131 may join a live edit session for a document that is in a publication-controlled editing mode, if the viewing user is authorized to do so for that document.

Figure 1D:
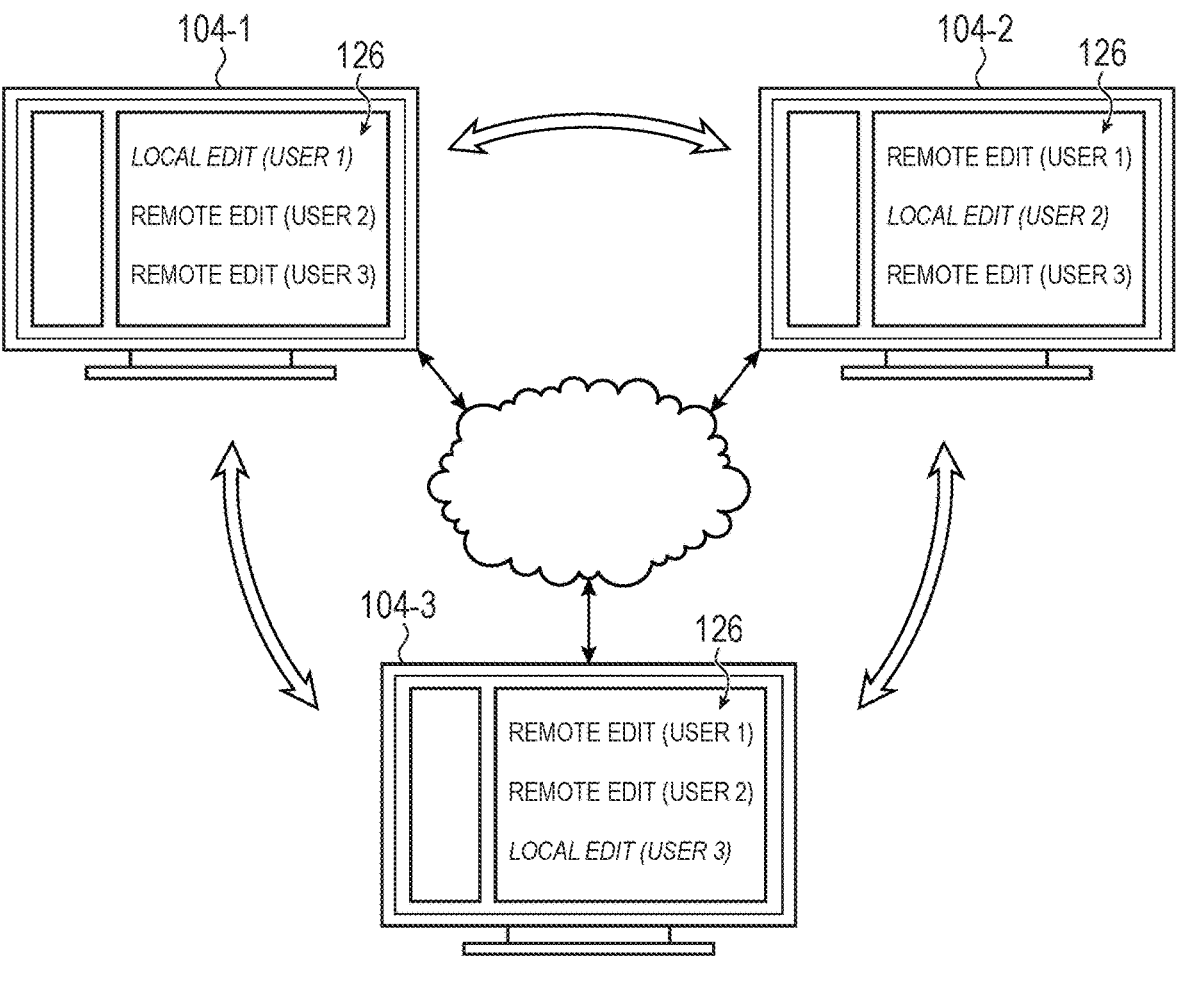
FIG. 1D depicts example client devices editing a document in a synchronous editing mode.
Figure 1E:
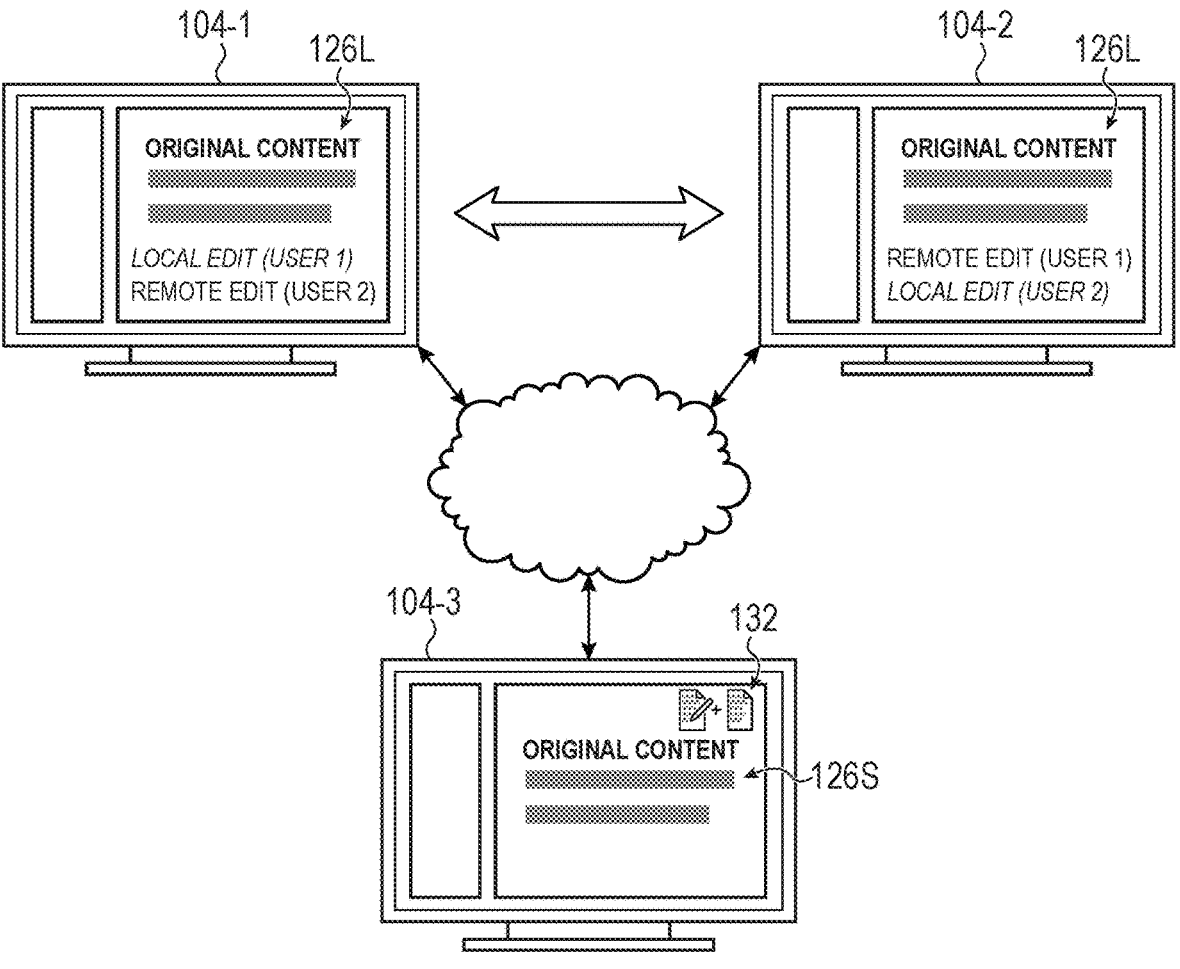
FIG. 1E depicts example client devices editing a document in a publication-controlled editing mode.

FIGS. 1D-1E illustrate how documents may appear on an example set of client devices 104 when a document is in a synchronous or a publication-controlled editing mode. FIG. 1C illustrates a document 126 in a synchronous editing mode, in which three users (corresponding to three client devices 104-1, 104-2, 104-3) are interacting with the document 126. In some cases, the synchronous editing mode is a default presentation mode for documents in the content panel. For example, upon selection of a document in a document tree, as described herein, the selected document may be displayed in the content panel in the synchronous editing mode.

As shown in FIG. 1D, in the synchronous editing mode, the document 126 is editable by each user, and each user's edits are visible, in real time, to each other user. Thus, the remote edits of users 2 and 3 are visible, in real time, to user 1 on client 104-1. Similarly, the remote edits of users 1 and 3 are visible, in real time, to user 2 on client 104-2. As described herein, the edits may be received and propagated to the various users by the content collaboration system 112-1 (e.g., the document edit control service 115).

In some cases, in the synchronous editing mode, documents may be freely edited without affirmatively entering or selecting an editing interface or editing mode. For example, a user may simply click on a location in the document and begin editing (e.g., typing, deleting, adding images or other content, etc.). In other cases, the system may require users to affirmatively enter an editing session in order to begin editing the document (e.g., to avoid inadvertent changes to the document). In either case, the edits being made to the document are viewable by each other user.

FIG. 1E illustrates a publication-controlled editing mode, in which three users (corresponding to three client devices 104-1, 104-2, 104-3) are interacting with the document 126. In some cases, the publication-controlled editing mode results from at least one user affirmatively initiating a publication-controlled editing mode for the document 126, as described herein. Once initiated, the publication-controlled editing mode may override the default synchronous editing mode for the document. Notably, the experience of editing the document in the publication-controlled editing mode may be substantially the same, to the editing users, as in the synchronous editing mode. For example, the document may be presented, for editing, in the same content panel of the graphical user interface in which the document is displayed in a synchronous editing mode, and may use the same editing controls. Moreover, edits of other users (e.g., remote users) may appear to the other editing users, as described herein.

As shown in FIG. 1E, in the publication-controlled editing mode, a live edit version of the document 126L is editable by users 1 and 2 of clients 104-1 and 104-2, and each of those user's edits are visible, in real time, to each other user. Thus, even in the publication-controlled editing mode, synchronous editing functionality may be provided for a subset of users. However, for a third user of client 104-3 who has not affirmatively joined the editing session, a static version of the document 126S may be displayed. The static version of the document 126S may include the content of the document at the time the publication-controlled editing mode was initiated. The edits that are being made to the live edit version of the document 126L are not included in the static version of the document, until the document is published by a user of the publication-controlled editing session. The third user may choose to edit the document, such that the third user joins the publication-controlled editing session and is able to edit the live edit version of the document 126L (and view the edits being made by other users in the publication-controlled edit session). In some cases, a user with suitable authorizations or permissions may choose to join a publication-controlled editing session for a document by selecting a selectable object or control, as described herein.

In some cases, a graphical indicator 132 may be displayed in conjunction with the static version of the document 126S to indicate that the document is currently in a publication-controlled editing mode. Thus, users who navigate to the document can readily determine a current edit mode of the document.

FIGS. 2A-2D depict example views of a graphical user interface 200 or a frontend application executing on a client device of a user. The graphical user interface may be implemented in a web browser client application using HTML, JavaScript, or other web-enabled protocol. The graphical user interface (GUI) 200 may allow the user to create, edit, or otherwise modify user-generated content that is stored as an electronic document or page (e.g., in the data store 116-1 of the content collaboration system 112-1). The graphical user interface 200 may have various partitions/sections displaying different content. For example, the graphical user interface 200 may include a navigational panel 204, a toolbar 206, and a content panel 208.

The content panel 208 may display the contents of a selected document or other content item, and may allow a user to edit the selected document or content item (e.g., to add, change, or remove content) in multiple edit modes (e.g., a synchronous editing mode and a publication-controlled editing mode). In general, when an authenticated user has edit permissions with respect to the displayed content, the content panel 208 may operate as a content editor and allow the user to directly add, edit, modify, or otherwise interact with the content of the document or content item. When a user does not have edit permissions, the document or content item may be displayed in a view-only mode, or with only limited ability to add, edit, or otherwise modify the content.

The navigational panel 204 may include a hierarchical element tree 205 (also referred to herein as a page tree), which may be associated with a particular document space or content space. The hierarchical element tree 205 includes tree elements, which may be selectable to cause display of a corresponding page or document. Tree elements may also be referred to herein as selectable elements. Each tree element shown in the navigational panel 204 may be displayed according to its respective hierarchical relationship to the current electronic document, page, or electronic content being displayed. Further, each tree element for the hierarchical element tree 205 may be selectable. In response to a user selection of a respective element of the hierarchical element tree 205, content of the respective page or document may be displayed in the content panel 208.

The navigational panel 204 also includes items that may be selected in order to cause display of other user-generated content that is outside of the hierarchical element tree 205. Specifically, the navigational panel 204 includes an overview element that is selectable to cause display of space-overview content in the content panel 208, a blog element that is selectable to cause display of one or more respective blog entries in the content panel 208, and a settings element that can be used to access setting associated with the current page being viewed and/or the document space. In some cases, display of the navigational panel 204 may be suppressed or hidden using a control provided in the graphical user interface 200. Additionally or alternatively, the navigational panel 204 may be resized or slid all the way to the side of the graphical user interface in order to hide or suppress display of the navigational panel 204.

The page toolbar 206 may provide, to a user, various control options, including but not limited to, menu controls, document creation controls (e.g., create), a search or query control (e.g., for the user to enter one or more keywords to perform search for electronic documents, pages, or electronic content that may be related to the one or more keywords entered by the user), account or profile access controls, notification indicators, etc. The menu controls may include options for selecting a different document space, view recently viewed documents or pages, view people associated with the system or respective content, navigate, or launch other applications, or view other aspects of the system. The content create element 210 may initiate the creation of content items in the content collaboration system 112-1.

Figure 2A:
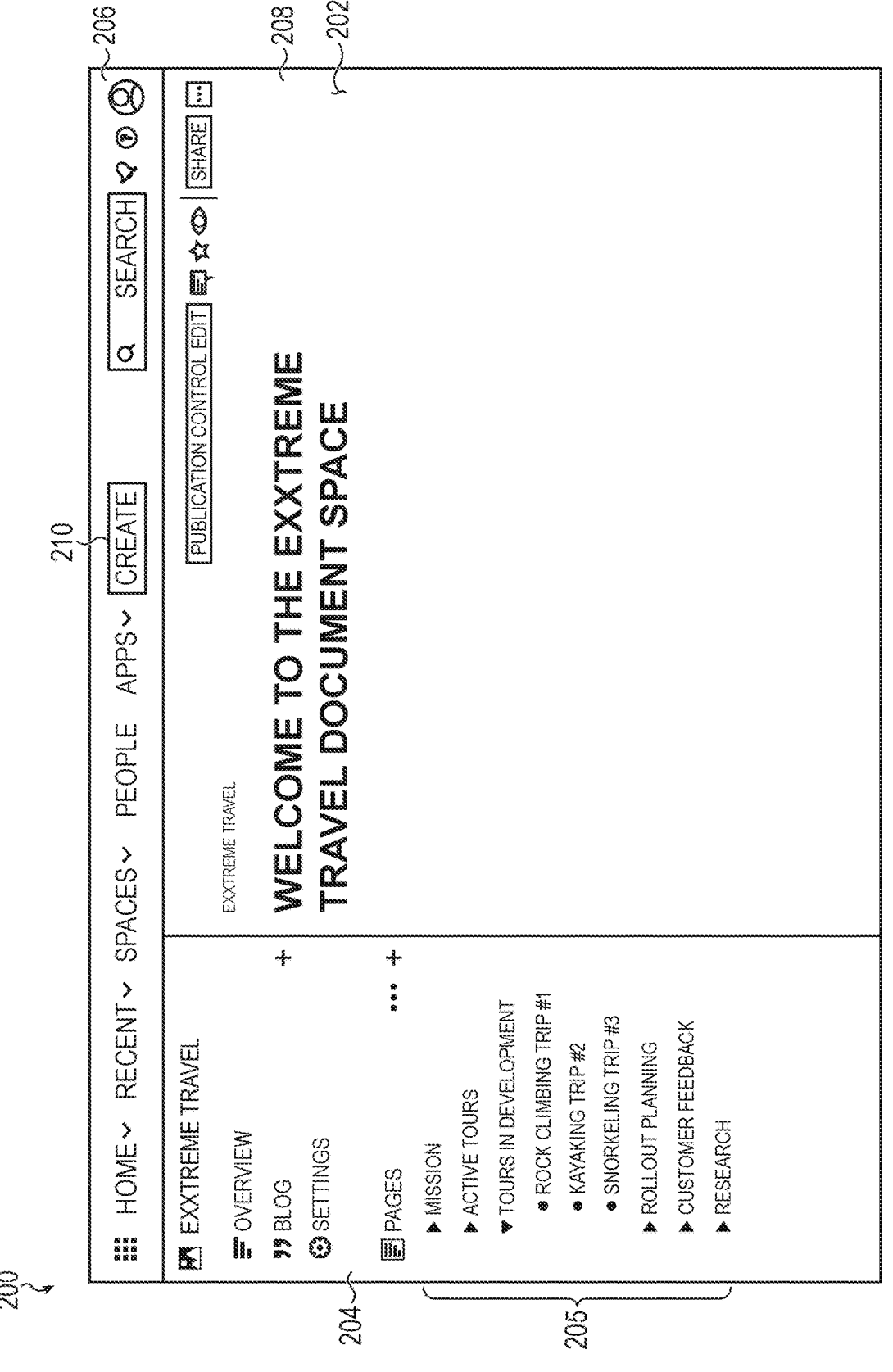
FIG. 2A depicts an example graphical user interface of a software application.

FIG. 2A illustrates the graphical user interface 200 displaying a top-level document 202 of a workspace (e.g., the extreme travel workspace). While synchronous editing mode and publication-controlled editing mode functionality are described in greater detail with respect to the document 203 in FIGS. 2B-2D, the document 202 may be displayed, in the content panel 208, in the synchronous editing mode. As noted, the synchronous editing mode may be a default mode for a document, and as such, any document displayed in the content panel 208 may be in a synchronous editing mode until and unless an affirmative action is taken to initiate a publication-controlled editing mode.

Figure 2B:
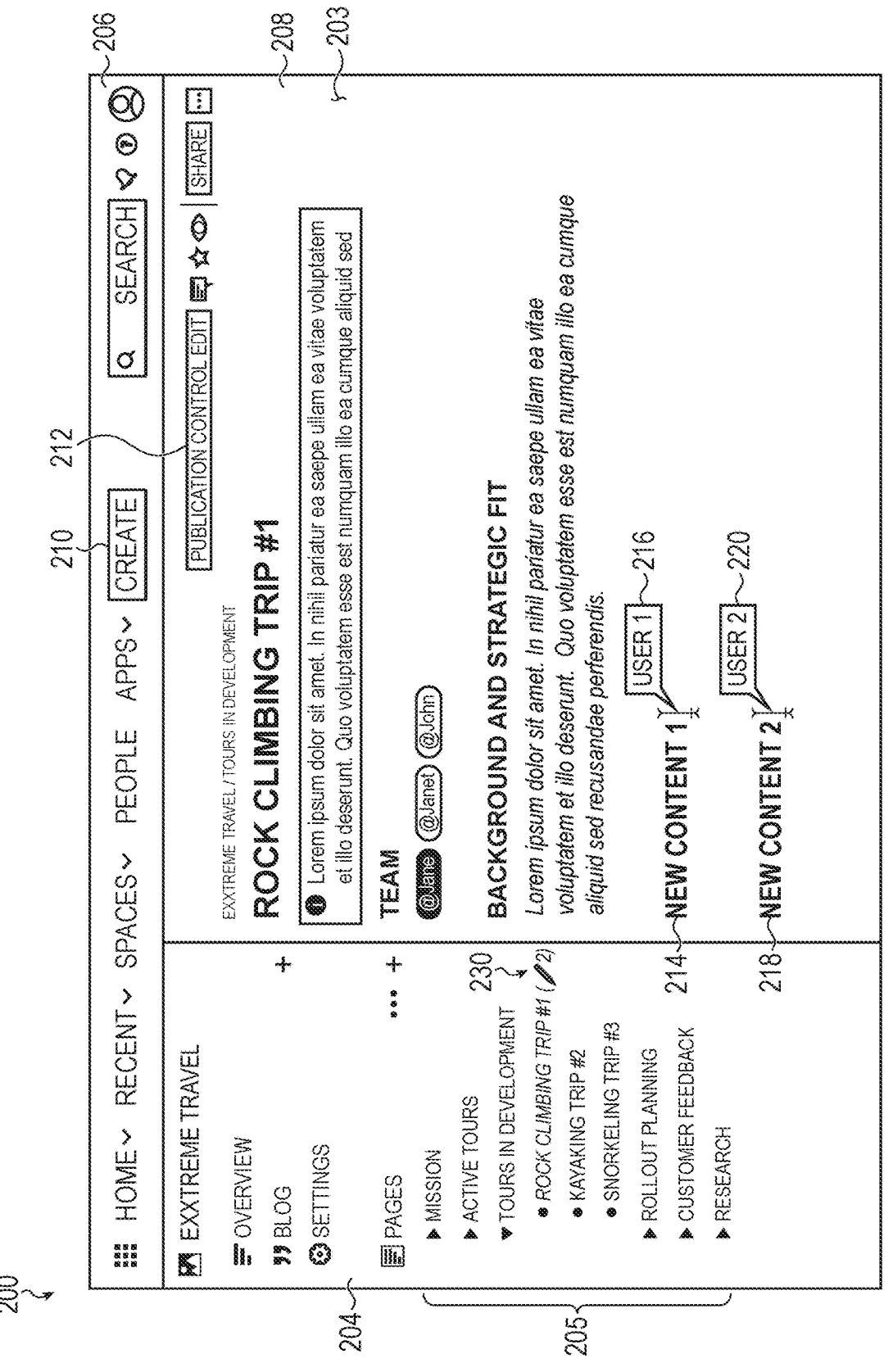
FIG. 2B depicts a document in a synchronous editing mode being displayed in an example graphical user interface of a software application.

FIG. 2B illustrates the graphical user interface 200 after a user selection (e.g., a mouse click) of one of the selectable elements in the hierarchical element tree 205 (e.g., "rock climbing trip #1"). In response to the selection of the selectable element, the document 203 corresponding to the selectable element is displayed in the content panel 208. As described herein, the document 203 may be displayed in the synchronous editing mode in which the document is editable by multiple users and edits from each user are visible, in real time, to each other user. Further, edits may be provided by interacting directly with the document in the content panel 208. For example, a user may click or otherwise select a location in the displayed document 203 (e.g., a mouse click), and begin editing the document (e.g., typing or deleting text, adding images, videos, or other content, etc.). In some cases, when an editable document is displayed in the content panel 208, document edit controls 222 (FIG. 2C) are displayed in conjunction with the document. The visibility of document edit controls 222 may be selectable by a user, such that a user can hide document edit controls 222 at their discretion. In some cases, document edit controls are hidden, by default, in a synchronous editing mode, and visible, by default, in a publication-controlled editing mode, though users may change the default behavior for the different modes, and may hide or unhide the controls 222 at any time.

FIG. 2B illustrates an example display of real-time user edits to the document 203 in the synchronous editing mode. For example, a first edit 214 may be made by a first user (user 1), operating locally in the graphical user interface 200 of a client computer. Additionally, a second edit 218 may be made by a second user (user 2), operating remotely in a graphical user interface of a remote client computer. As shown in FIG. 2B, the remote second edit 218 is displayed, in real time, in the document 203 to the first user. Notably, the same view as illustrated in FIG. 2B may be displayed to every user who is viewing the document (e.g., each user who has selected the document 203 from the page tree), including viewers who are not actively editing the document or who even intend to edit the document. In some cases, indicators 216, 220 are included in the document 203 that identify the users who are editing the document.

New content may also have a distinctive appearance that differentiates new content from previously existing content. For example, new content may have a different font color (or different font appearance, such as underlined, bold, etc.) than previously existing content. In some cases, the differentiating appearance may cease after a predetermined time period has elapsed since it was included (e.g., 5 seconds, 10 seconds, 60 seconds, 5 minutes, etc.). A similar function may apply to deleted content (e.g., it may be shown in strikethrough or in a different color for a predetermined time period, after which it disappears).

In some cases, a graphical indicator 230 may be included in the graphical user interface 200 to indicate a number of users who are actively editing or recently edited the document. This may be based on a count of users who have made some change to the document content (e.g., adding content, deleting content, moving content, etc.) within a threshold time window (e.g., within the previous 1 minute, 2 minutes, 5 minutes, 10 minutes, etc.). In some cases, interactions with the document that do not change its content (e.g., viewing, scrolling, sharing, etc.) will not result in a user being determined to be editing the document, and such users will not be included in the count.

As described herein, in some cases users may wish to edit the document 203 in a publication-controlled editing mode. Accordingly, a publication-controlled edit mode selector 212 (also referred to simply as an edit mode selector) may be included in the graphical user interface 200. A user selection of the edit mode selector 212 may correspond to a request (to the content collaboration system 112-1, for example) to edit the document in a publication-controlled editing mode. In response to receiving the request, the publication-controlled editing mode may be initiated for the document 203.

Figure 2C:
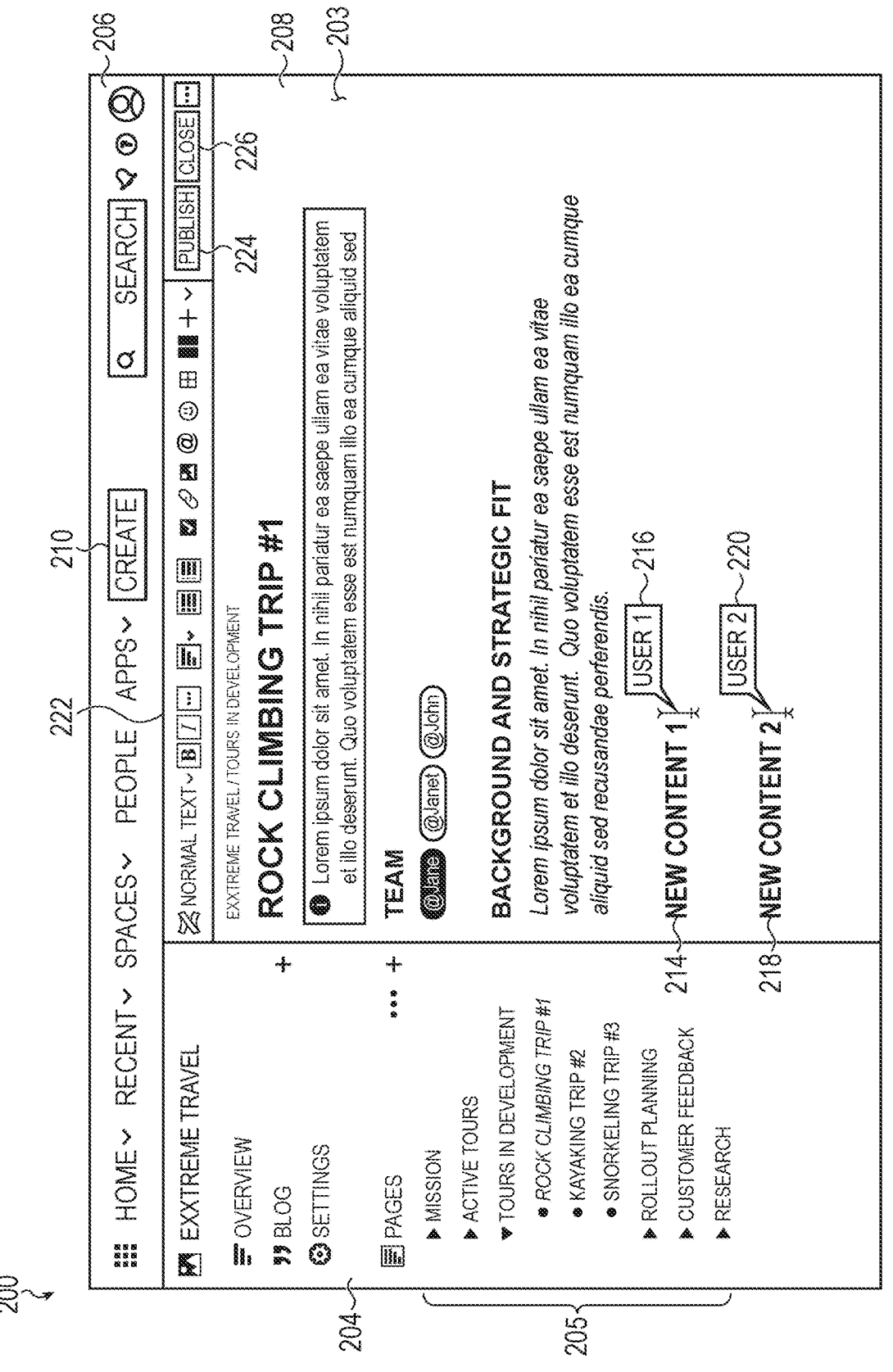
FIGS. 2C-2D depict a document in a publication-controlled editing mode being displayed in an example graphical user interface of a software application.
Figure 2D:
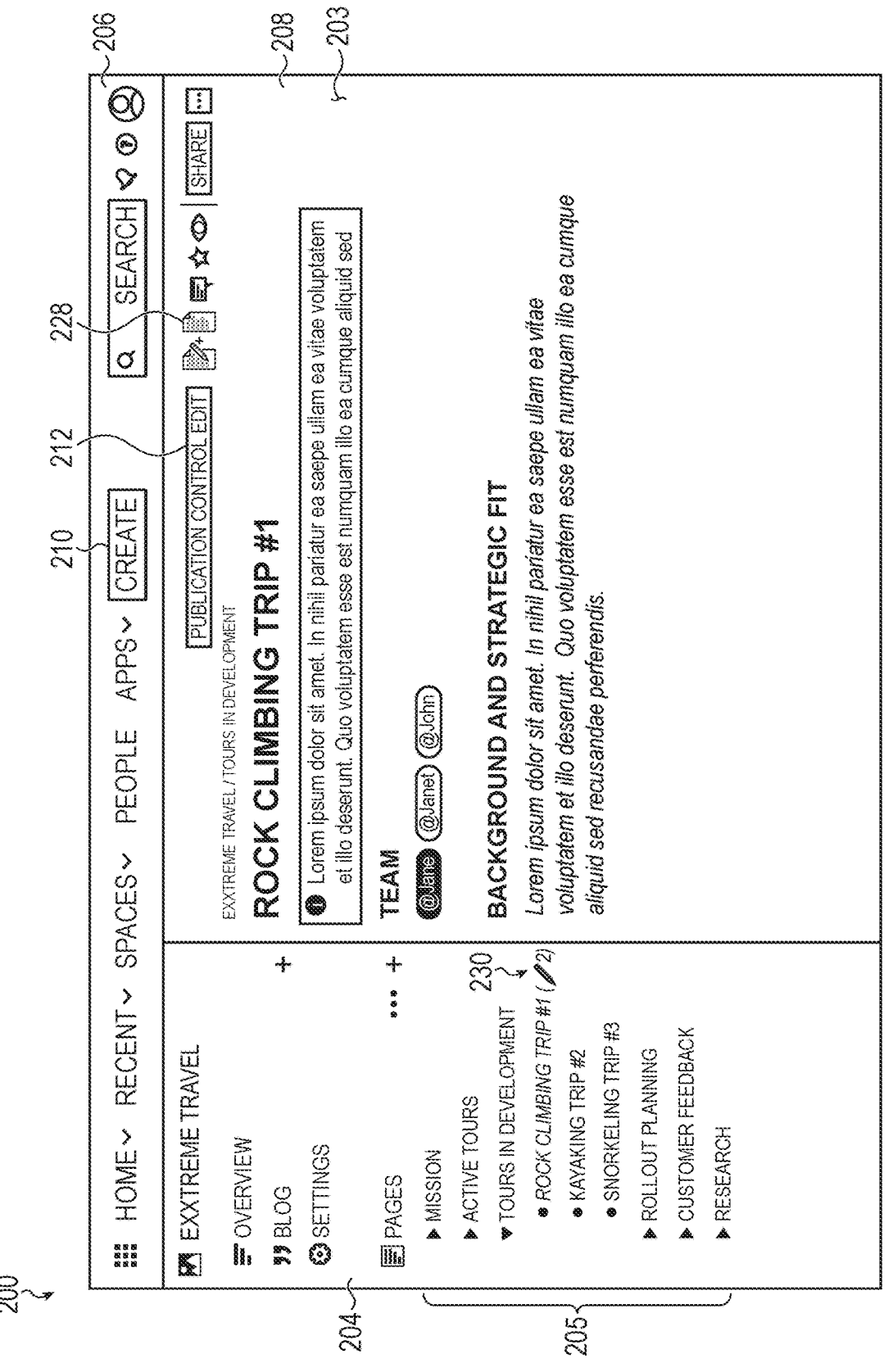

FIGS. 2C-2D illustrate how the same document 203 may appear to a first user who is participating in the publication-controlled editing session (FIG. 2C) and to a second user who is not participating in the publication-controlled editing session, but is viewing the document 203 while it is in the publication-controlled editing mode (FIG. 2D) (e.g., other users are editing the document in a separate session). Thus, the graphical user interfaces 200 in FIGS. 2C and 2D may be understood as being displayed on different client devices, to different users.

The document 203 in FIG. 2C corresponds to a publication-controlled editing session of the document 203, in which only users who have affirmatively requested to initiate and/or join are able to view the real time edits of other users. Thus, as shown in FIG. 2C, the edits from users 1 and 2 are visible, in real time, to both users 1 and 2 on their respective client devices. In this respect, the document 203 in the publication-controlled editing mode appears similar, to the editing users, as the synchronous editing mode as shown in FIG. 2B. However, these edits are not visible in real time to users who are not participating in the publication-controlled editing session until and unless a document publication request is received. Accordingly, in the publication-controlled editing mode, a publication control 224 may be displayed to users who have joined the publication-controlled editing session.

Selection of the publication control 224 may generate a publication request (e.g., to the content collaboration system 112-1) to push the current edits in the publication-controlled edit version of the document to the general user base. For example, in response to receiving the publication request, the edits may be formally incorporated into the static version of the document and the edited document may be displayed to other users (who are not in the publication-controlled editing session). In some cases, only the edits that were made by the user who initiated the publication request are published in response to the request. In other cases, a publication request initiated by any user causes all edits in the document 203 (e.g., any edit made by any user in the publication-controlled editing session) to be published in response to the request.

In some cases, a user who is participating in a publication-controlled editing session may wish to exit the editing session without publishing the document. Accordingly, a session close control 226 may be displayed to users in the publication-controlled editing session. Selection of the session close control 226 may cause the user to exit the publication-controlled editing session without publishing any edits, at which time they will revert to viewing the static document (e.g., the document that was current at the time the publication-controlled editing mode was initiated). If other users are still participating in the publication-controlled editing mode, they may still publish the document with any edits from users that have previously left the publication-controlled editing session. In some cases, an edited but unpublished document may be saved for later editing. Thus, a document may remain in a publication-controlled editing mode even when there are no active publication-controlled editing sessions occurring.

FIG. 2C illustrates the navigational panel 204 being displayed during the publication-controlled editing session. In some cases, the navigational panel 204 may be omitted from the graphical user interface 200 when a document is being displayed for editing in a publication-controlled editing session. In some cases, whether the navigational panel 204 is displayed or omitted during a publication-controlled editing session is a user-selectable setting.

As described herein, when a document is in a publication-controlled editing mode, users who are not participating in the publication-controlled editing session may be presented with a static version of the document, which corresponds to the document content as of the time the publication-controlled editing mode was initiated. FIG. 2D illustrates an example of the graphical user interface 200 displaying a static version of the document 203, which is in a publication-controlled editing mode, to a user who is not participating in the editing session.

A graphical indicator 228 may be displayed in conjunction with a document 203 when the document 203 is in a publication-controlled editing mode, to indicate to users the current edit mode of the document that they have selected for viewing. Further, in order to reduce possible problems with conflicting edits, when a document is in the publication-controlled editing mode, edits to the static version of the document are not permitted. Thus, while under normal circumstances, a user may simply edit the document 203 directly in the content panel 208, in FIG. 2D, the document 203 may not accept edits. The graphical indicator 228 may therefore indicate to a user that the document is in a publication-controlled editing mode and that edits cannot be made unless the user joins the publication-controlled editing session (which the user may do by selecting the edit mode selector 212). The graphical indicator 228 also indicates to the user that the document version that they are viewing may not be the most current version, or it may be likely to change soon due to the active publication-controlled editing session. Additionally, a graphical indicator 230 may be included in the graphical user interface 200 to indicate a number of users who are actively editing the document in the publication-controlled editing session.

In some cases, when a new document or content item in a document space is created (e.g., in response to a selection of the "create" control element in the graphical user interface 200), the document may initially be in a publication-controlled editing mode. Moreover, the document may not appear in the document space until an initial publication request is received for the document. In such cases, because the new document is not visible to the general user base in the page tree, other potential editors of the document may not be able to easily see the document in order to edit the document. Accordingly, a document creator may invite users to access the unpublished document for editing and/or viewing. Once a user is invited, the document may appear in that user's element tree, such that the user can interact with the unpublished document in the same manner as a published document that is in a publication-controlled editing mode.

Figure 2E:
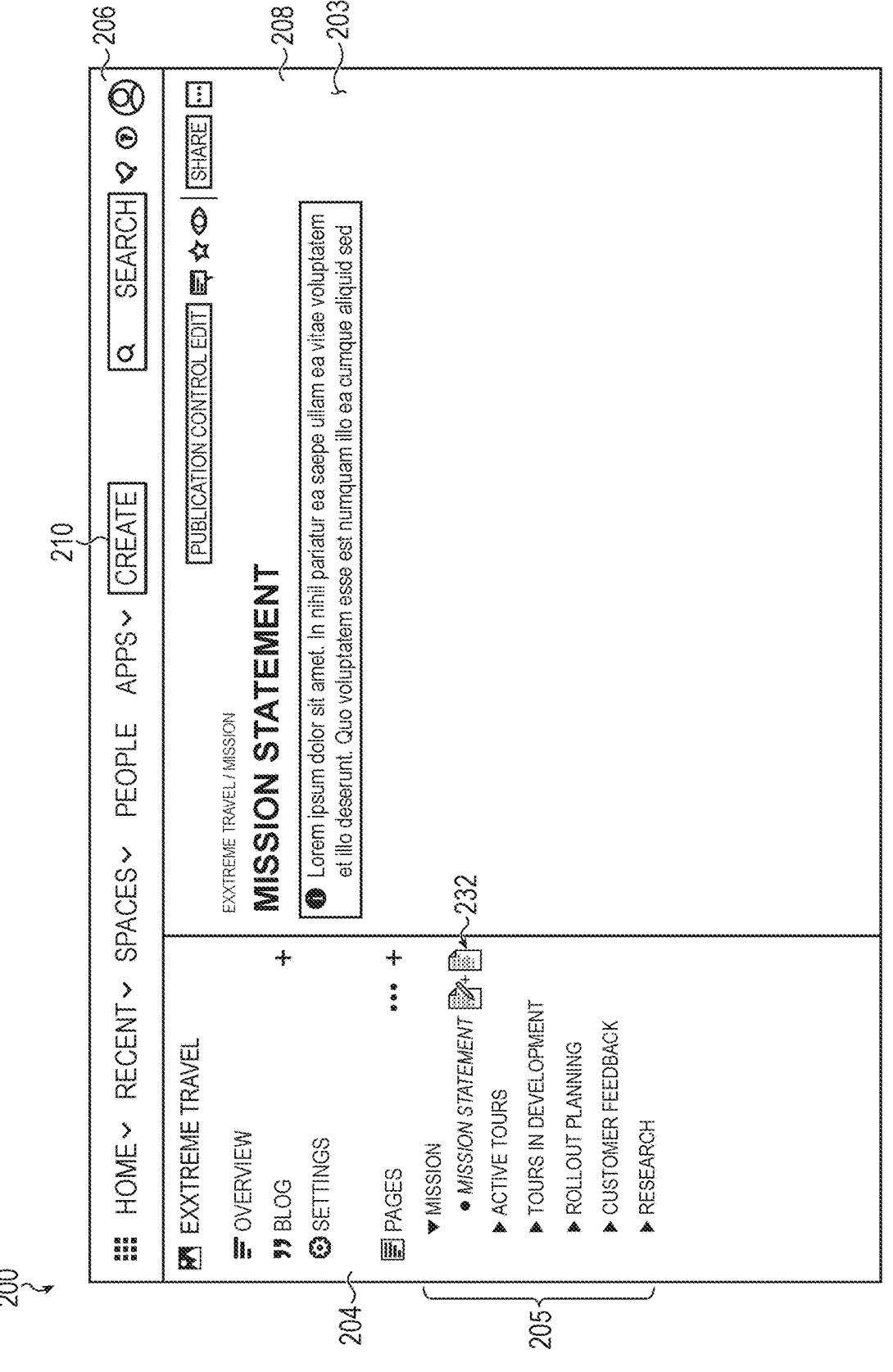
FIG. 2E depicts a document that is not editable in a synchronous editing mode being displayed in an example graphical user interface of a software application.

In some cases, certain documents may not be available for live editing by the general user base, and instead may be locked for editing to everyone except authorized users. Moreover, such documents may only be editable in the publication-controlled editing mode, such that edits to the document are not viewable by the general user base until the document is published (e.g., by one of the authorized users). FIG. 2E illustrates an example user interface 200 illustrating an example of such a document. In particular, the document "Mission Statement" under the "Mission" element in the hierarchical element tree 205 may be restricted to real-time editing by the general user base. A graphical indicator 232 may be displayed in conjunction with the document to indicate that the document is published under a non-real-time editing paradigm (e.g., live edits are not accepted). This may also indicate that the document is operable only in a publication-controlled editing mode, indicating to users that they should not expect synchronous editing functionality for that document. Authorized editors may still enter a publication-controlled editing session for the document and their edits may be published to the document in response to publication requests, consistent with the operation of the publication-controlled editing mode.

Figure 2F:
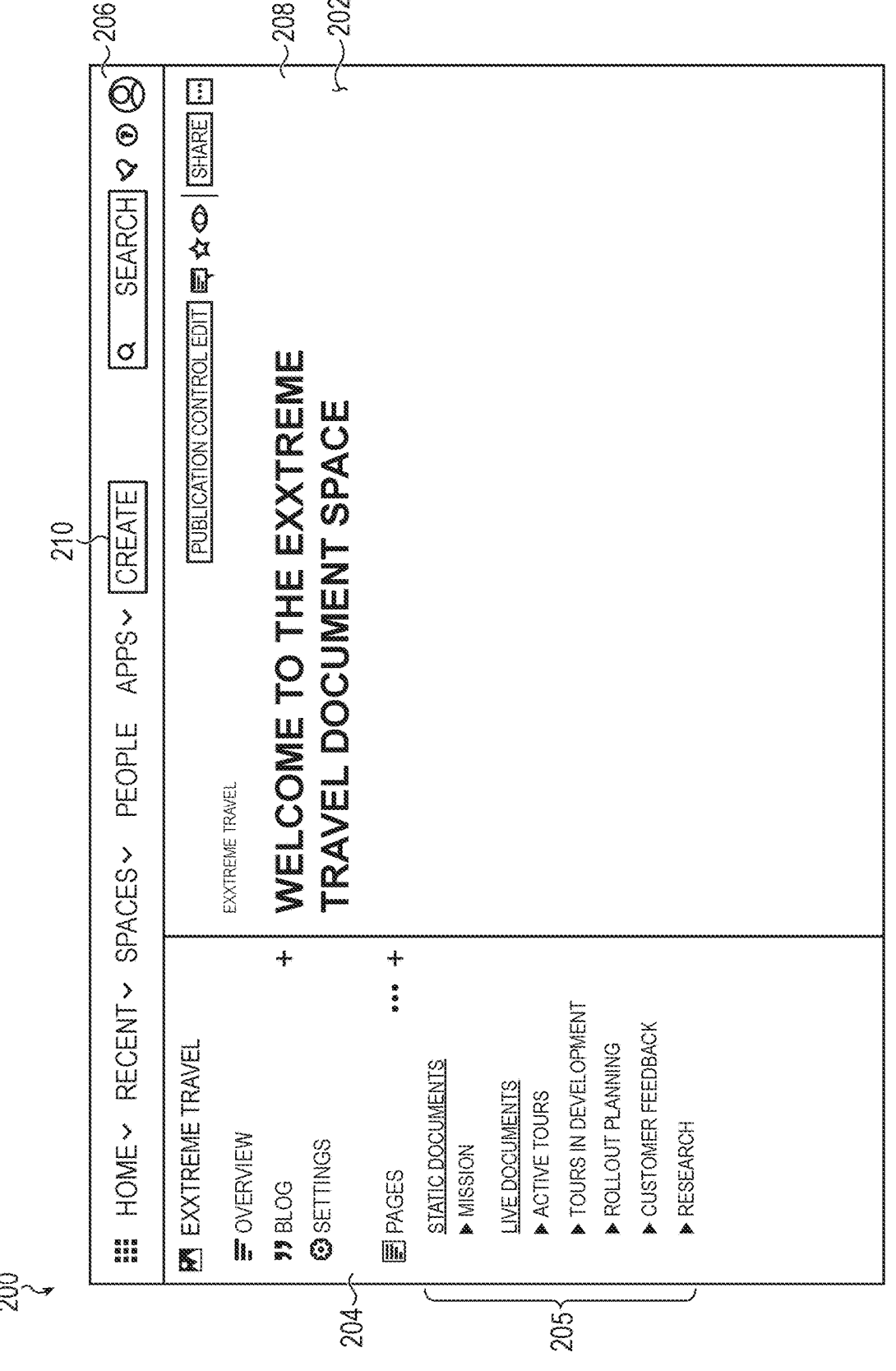
FIG. 2F depicts an example graphical user interface with static and live document sections in a hierarchical element tree.

In some cases, a document space may be divided into regions for static documents (e.g., documents that are not editable in a synchronous editing mode) and live documents (e.g., documents that are editable in the synchronous editing mode). FIG. 2F illustrates the graphical user interface 200 with separate edit groups, within a document space, for each type of document. Documents may be moved between the edit groups by authorized users. Thus, for example, a user who has sufficient permissions may move a document from a static document group (where synchronous editing is not permitted) to a live document group (where synchronous editing is permitted). Documents may be moved between spaces via a drag and drop operation, where the selectable element associated with a document may be dragged, in the navigational panel 204, from one group to another group. In response to detecting that the selectable element has been moved to a different editing group in the graphical user interface, the available editing modes for that document may be updated (e.g., by the content collaboration system 112-1) to correspond to the editing modes defined for the new editing group.

If a document is moved to a different editing mode while users are editing the document, they may be prompted with a notification or warning that the edit mode for that document will be changing. In some cases, the document is not officially moved until each user who is editing the document in a mode that is inconsistent with the target mode. For example, if a first user is editing a document in a synchronous editing mode, and a second user moves the document to a static document group (e.g., where only publication-controlled editing is permitted), the document may not be moved until the first user has navigated away from the document and/or has explicitly indicated that they are finished editing the document (e.g., by selecting a confirmation control in the graphical user interface). Once the editors in the synchronous editing mode have navigated away from the document and/or confirmed that they are no longer editing the document, the document may be moved (within the hierarchy of the document space) to the target static document group. Similarly, if a first user (e.g., with edit privileges) is editing a document in the static document group, and a second user moves the document to a live document group (e.g., where synchronous editing is permitted), the document may not be moved until the first user (and optionally all editing users) have published the document. In response to the publication request, the document may be moved (within the hierarchy of the document space) to the target live document group.

Groups of documents may be moved between the live and static document groups via the same or similar operations as a single document. For example, a user may drag the "Tours In Development" element to the "Static Documents" group, resulting in all documents under the "Tours In Development" heading to be moved to the "Static Documents" group.

As described herein, users may be associated with various permissions with respect to the documents in a document space, and the permissions may define how a given user may interact with given documents. For example, a user may have no permissions, view-only permissions, and edit permissions. When a user has no permissions with respect to a given document (e.g., no view or editing permissions), the document may not be visible in the user's hierarchical element tree for a given workspace. With view-only permissions, a user may view a document, but may not edit the document (in either a synchronous editing mode or a publication-controlled editing mode). With edit permissions, a user may edit the document.

In some cases, edit permissions for a given document allow a user to edit the document in any available editing mode (e.g., synchronous editing mode, publication-controlled editing mode). In other cases, edit permissions may be subdivided into synchronous editing permissions and publication-controlled editing permissions. Thus, for example, a user with only synchronous editing permissions may be permitted to edit the document in a synchronous editing mode but not in a publication-controlled editing mode. Similarly, a user with only publication-controlled editing permissions may be permitted to edit the document in the publication-controlled editing mode but not in the synchronous editing mode. Other permissions schemes are also contemplated. Certain users may have certain permissions with respect to documents based on various factors, such as manual assignment (e.g., an administrator may assign edit permissions for a given document to select individuals). In other cases, edit permissions may be based on a user's position in an organization, or a role in a given project or document space, or the like.

Figure 3:
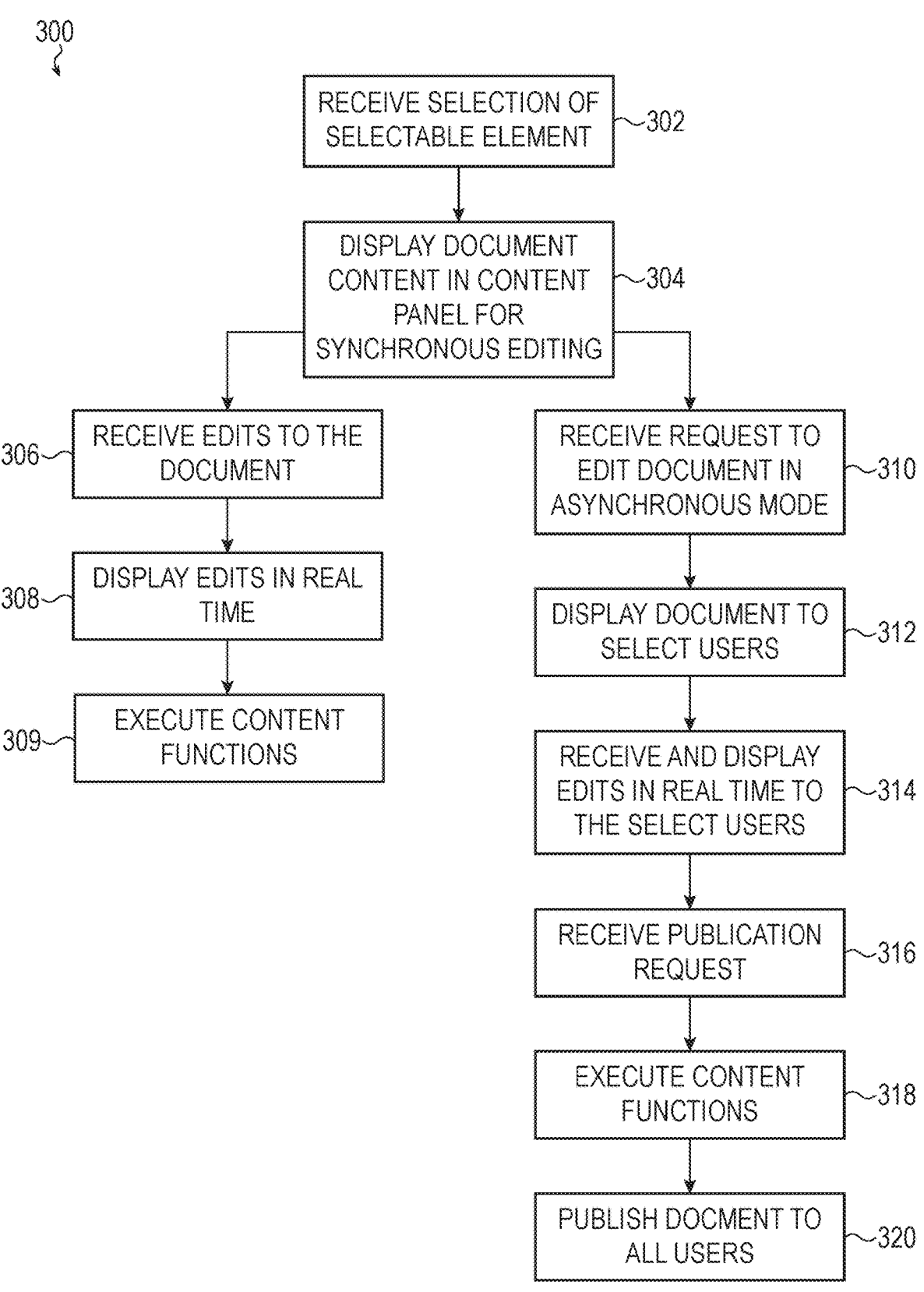
FIG. 3 depicts an example process for managing document edits in a software application.

FIG. 3 illustrates a process 300 by which the content collaboration system 112-1 may manage document edits in a system that facilitates both synchronous editing modes and publication-controlled editing modes for its documents. The process 300 may be performed while the content collaboration system is causing a client computer to display a graphical user interface that includes a content panel (e.g., the content panel 208) that configured to display content of a selected content item in a publication-controlled editing mode and in a synchronous editing mode, and a navigational panel (e.g., the navigational panel 204) that includes including a hierarchical element tree (e.g., the hierarchical element tree 205). At operation 302, a selection of a selectable element in the hierarchical element tree is received. For example, a user may click on or otherwise select a selectable element in the hierarchical element tree 205. In response to the selection, at operation 304, the selected document may be displayed in the content panel in the synchronous editing mode. As noted above, the synchronous editing mode may be a default editing mode for documents, and as such, the initial selection of a document from the hierarchical element tree may cause the document to be opened in the synchronous editing mode.

As described herein, a displayed document may be edited in the synchronous editing mode, and may also be edited in a publication-controlled editing mode if selected by a user. For example, at operation 306, while the document is displayed in the content panel in the synchronous editing mode, edits to the document may be received. As described herein, the edits may be provided directly to the document in the content panel.

At operation 308, consistent with the description of the synchronous editing mode described herein, the document with the edits may be displayed, in real time, to other users. Thus, for example, in response to receiving, from the first user, a first edit to the document, the document with the first edit is displayed, in real time, to a second user.

At operation 309, content functions for the document may be executed. As described herein, at least some content functions may be executed in the synchronous editing mode differently than they are in the publication-controlled editing mode. For example, in the publication-controlled editing mode, certain content functions may be executed in response to receiving a publication request (operation 318). As edits are incorporated into a document in the synchronous editing mode without explicit publication requests, the content functions may be executed in response to different criteria in the synchronous editing mode. Moreover, different content functions may be executed, in the synchronous editing mode, in response to different conditions, as described herein.

Example content functions include, without limitation, updating a title of the document in a hierarchical element tree, updating document metadata in a data store, notifying users of the changes made to the document, notifying users of mentions within the document, notifying users of comments made in a document, updates to a table of contents of the document, retrieval of linked content in the document, and the like. In the synchronous editing mode, content functions may be executed in response to various conditions and/or events. For example, content functions may be executed periodically, such as on a predetermined cycle (e.g., a cycle of about 1 minute, about 2 minutes, about 5 minutes, about 10 minutes, about 30 minutes, or the like). Thus, for example, a document title may be updated in the hierarchical element tree on a periodic cycle of every 2 minutes. As another example, the content collaboration system 112-1 may process documents on a cycle of about 5 minutes to retrieve linked content (e.g., videos, images, linked data, other documents, etc.). Different content functions may be executed on the same or different time periods.

In the synchronous editing mode, some content functions may be executed in response to the occurrence of an event, such as a user input. For example, in some cases, the system may be configured to notify certain users when certain documents are edited (e.g., when the document is edited, and not according to a cyclic or periodic update cycle). In other cases, notifications that a document has been edited are issued to users according to a periodic update interval. For example, the content collaboration system 112-1 may perform a notification cycle (e.g., about every 30 minutes, about every hour, about every day, etc.) in which users are notified if a particular document has been edited. Edit notifications may be issued to various users based on various conditions or properties. For example, users may subscribe to notifications for particular documents. As another example, users with edit permissions for a document may be subscribed to notifications for particular documents. As yet another example, document authors and users who have previously edited documents may be subscribed to notifications for those documents. Notification subscriptions may be user configurable, and users may opt in to or opt out of notifications for individual documents or classes of documents.

As another example, the system may be configured to notify a user in response to an edit to a document including a mention of that user (e.g., when a user identifier of that user is included in a document). Thus, for example, if an editor, during synchronous editing, includes a user identifier of a user in a document (e.g., mentions the user), a notification may be sent to the mentioned user in an aperiodic manner (e.g., in response to the mention, and not on a periodic update cycle).

In some cases, in a synchronous editing mode, different content functions are executed in response to different conditions. For example, a first set of content functions may be executed periodically, while a second set of content functions may be executed aperiodically and in response to the occurrence of certain events. For example, edit notifications (e.g., notifications that a document has been edited) and table of contents updates (e.g., updating a table of contents of a document) may be executed periodically, while mention notifications (e.g., notifying a user that they were mentioned in a document) and content fetching functions (e.g., fetching and incorporating remote content such as videos) may be executed aperiodically and in response to the mention and/or the inclusion of the content. Other assignments of content functions to periodic and aperiodic execution cycles are also contemplated.

As noted above, documents displayed in a content panel of a graphical user interface may be editable, in the same content panel and/or the same graphical user interface, in a synchronous editing mode and in a publication-controlled editing mode. Moreover, documents that are selected for display may be displayed, by default, in a synchronous editing mode (operation 304). At operation 310, a request is received to edit the displayed document in a publication-controlled editing mode, rather than the synchronous editing mode.

In response to receiving a request to edit the document in the publication-controlled editing mode, at operation 312, the document may be displayed in the content panel, in the publication-controlled editing mode, to select users (e.g., users who have selected the publication-controlled editing mode for the document and/or affirmatively selected to join a publication-controlled editing session for the document).

Consistent with the publication-controlled editing mode as described herein, at operation 314, edits are received from the select users (e.g., the users in the publication-controlled editing session), and the edits are displayed, in real time, to the select users. As described herein, users who are not participating in the publication-controlled editing session (e.g., who have not affirmatively entered the publication-controlled editing session) do not see the edits in real time. Instead, the document that is displayed to such users is the document version that was in existence when the publication-controlled editing mode was initiated (e.g., a snapshot or cached version of the document at that time).

At operation 316, a publication request may be received from one of the select users in the publication-controlled editing session. In some cases, any user in the publication-controlled editing session may publish the document, while in other cases only the user who selected the publication-controlled editing mode may publish the document. Publication of the document need not end the publication-controlled editing session or otherwise change the document edit mode to the synchronous editing mode. In some cases, a document may be transitioned from publication-controlled editing mode to synchronous editing mode in response to a user affirmatively selecting the synchronous editing mode for a document. As another example, a document may be transitioned to the synchronous editing mode when there are no users viewing and/or participating in a publication-controlled editing session for that document.

In response to the publication request, at operation 318, content functions may be executed. In some cases, documents in the publication-controlled editing mode do not use periodic execution of content functions, but instead execute content functions in response to receiving the publication request. Thus, for example, in response to the publication request, the content collaboration system 112-1 may update a title of the document in a hierarchical element tree, update document metadata in a data store, notify users of the changes made to the document, notify users of mentions within the document, update to a table of contents of the document, and retrieve linked content in the document. Other content functions are also contemplated and may also be executed in response to receiving the publication request.

In response to receiving the publication request, at operation 320, the document may also be published to all authorized users. The published document may include all edits made during the publication-controlled editing mode (up to the point that the document was published). The published document may also include any remote content that was linked in the document during the publication-controlled editing mode and retrieved in response to the publication request.

Figure 4:
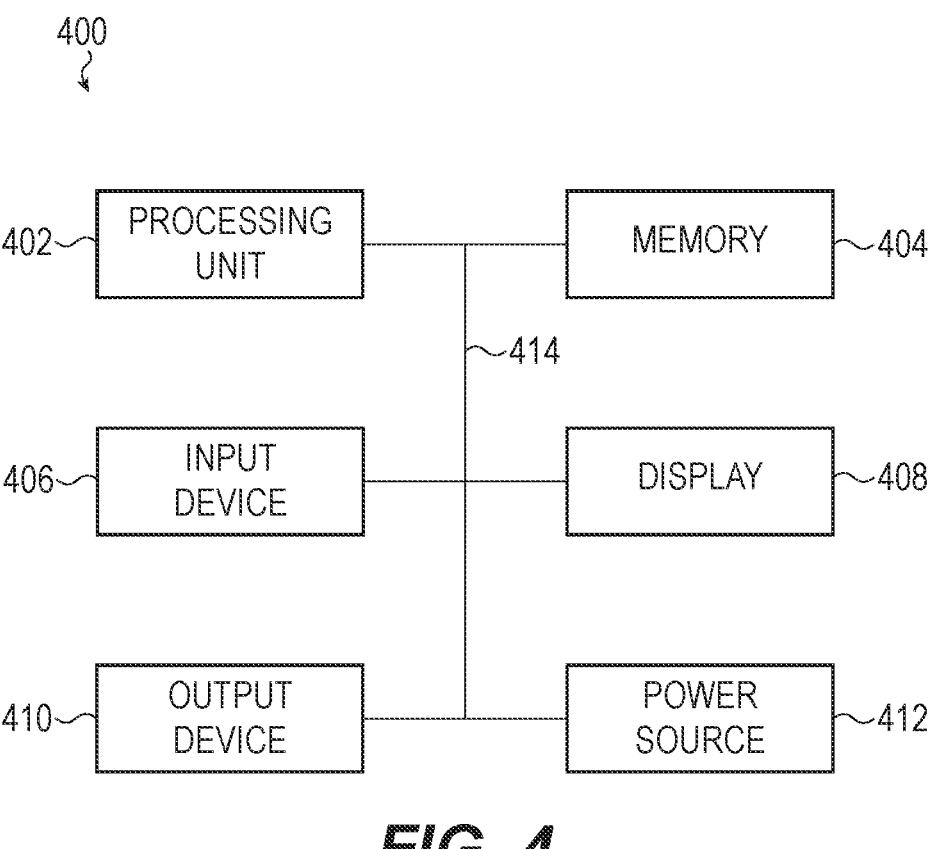
FIG. 4 depicts an example electrical block diagram of an electronic device that may perform the operations described herein.

FIG. 4 illustrates a sample electrical block diagram of an electronic device 400 that may perform the operations described herein. The electronic device 400 may in some cases take the form of any of the electronic devices described with reference to FIGS. 1A-3, including client devices 104 and/or servers or other computing devices associated with the networked computer system 100 (e.g., the application platform 102, software applications 112, etc.). The electronic device 400 can include one or more of a display 408, a processing unit 402, a power source 412, a memory 404 or storage device, input devices 406, and output devices 410. In some cases, various implementations of the electronic device 400 may lack some or all of these components and/or include additional or alternative components.

The processing unit 402 can control some or all of the operations of the electronic device 400. The processing unit 402 can communicate, either directly or indirectly, with some or all of the components of the electronic device 400. For example, a system bus or other communication mechanism 414 can provide communication between the processing unit 402, the power source 412, the memory 404, the input device(s) 406, and the output device(s) 410.

The processing unit 402 can be implemented as any electronic device capable of processing, receiving, or transmitting data or instructions. For example, the processing unit 402 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 400 can be controlled by multiple processing units.

For example, select components of the electronic device 400 (e.g., an input device 406) may be controlled by a first processing unit and other components of the electronic device 400 (e.g., the display 408) may be controlled by a second processing unit, where the first and second processing units may or may not be in communication with each other.

The power source 412 can be implemented with any device capable of providing energy to the electronic device 400. For example, the power source 412 may be one or more batteries or rechargeable batteries. Additionally or alternatively, the power source 412 can be a power connector or power cord that connects the electronic device 400 to another power source, such as a wall outlet.

The memory 404 can store electronic data that can be used by the electronic device 400. For example, the memory 404 can store electronic data or content such as, for example, audio and video files, documents and applications, device settings and user preferences, timing signals, control signals, and data structures or databases. The memory 404 can be configured as any type of memory. By way of example only, the memory 404 can be implemented as random access memory, read-only memory, Flash memory, removable memory, other types of storage elements, or combinations of such devices.

In various embodiments, the display 408 provides a graphical output, for example associated with an operating system, user interface, and/or applications of the electronic device 400 (e.g., a graphical user interface associated with a content collaboration system, which may include graphical elements related to displaying documents, receiving document creation requests, receiving and displaying user-generated modifications of documents, displaying a workspace and/or document hierarchy, etc.). In one embodiment, the display 408 includes one or more sensors and is configured as a touch-sensitive (e.g., single-touch, multi-touch) and/or force-sensitive display to receive inputs from a user. For example, the display 408 may be integrated with a touch sensor (e.g., a capacitive touch sensor) and/or a force sensor to provide a touch- and/or force-sensitive display. The display 408 is operably coupled to the processing unit 402 of the electronic device 400.

The display 408 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 408 is positioned beneath and viewable through a cover that forms at least a portion of an enclosure of the electronic device 400.

In various embodiments, the input devices 406 may include any suitable components for detecting inputs. Examples of input devices 406 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 406 may be configured to detect one or more particular types of input and provide a signal (e.g., an input signal) corresponding to the detected input. The signal may be provided, for example, to the processing unit 402.

As discussed above, in some cases, the input device(s) 406 include a touch sensor (e.g., a capacitive touch sensor) integrated with the display 408 to provide a touch-sensitive display. Similarly, in some cases, the input device(s) 406 include a force sensor (e.g., a capacitive force sensor) integrated with the display 408 to provide a force-sensitive display.

The output devices 410 may include any suitable components for providing outputs. Examples of output devices 410 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 410 may be configured to receive one or more signals (e.g., an output signal provided by the processing unit 402) and provide an output corresponding to the signal.

In some cases, input devices 406 and output devices 410 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 402 may be operably coupled to the input devices 406 and the output devices 410. The processing unit 402 may be adapted to exchange signals with the input devices 406 and the output devices 410. For example, the processing unit 402 may receive an input signal from an input device 406 that corresponds to an input detected by the input device 406. The processing unit 402 may interpret the received input signal to determine whether to provide and/or change one or more outputs in response to the input signal. The processing unit 402 may then send an output signal to one or more of the output devices 410, to provide and/or change outputs as appropriate.

Unless otherwise stated, the terms "include" and "comprise" (and variations thereof such as "including," "includes," "comprising," "comprises," "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage, or attribute that is not expressly recited in a claim should be considered as a required or essential feature. Accordingly, the specification and drawings are to be regarded in an illustrative rather than a restrictive sense.

What is claimed is:

1. A method comprising, in a content collaboration system comprising a plurality of user-generated documents:
   causing a client computer to display a graphical user interface including:
   a content panel configured to display a selected document in a publication-controlled editing mode and in a synchronous editing mode; and
   a navigational panel including a hierarchical element tree, the hierarchical element tree comprising a plurality of hierarchically arranged selectable elements, each respective selectable element being selectable to cause display of a respective document associated with the respective selectable element in the content panel; and in response to a selection, from a first user, of a selectable element in the hierarchical element tree, causing a document to be displayed in the content panel in the synchronous editing mode in which;

the document is editable by the first user and a second user;

edits from the first user are visible, in real time, to the second user;

edits from the second user are visible, in real time, to the first user; and while the document is displayed in the content panel in the synchronous editing mode and in response to receiving, from the first user, a first edit to the document, causing the document with the first edit to be displayed, in real time, to the second user; and in response to receiving, from the first user, a request to edit the document in the publication-controlled editing mode, causing the document to be displayed in the content panel in the publication-controlled editing mode; and while the document is displayed in the content panel in the publication-controlled editing mode:

receiving, from the first user, a second edit to the document; and causing the document to be displayed to the second user without the second edit, wherein edits from the first user are not visible to the second user until after a publication request is received from the first user.

2. The method of claim 1, further comprising:

while the document is displayed in the content panel in the publication-controlled editing mode, receiving a publication request from the first user; and in response to receiving the publication request, causing the document with the first edit to be displayed to the second user.

3. The method of claim 1, further comprising, while the document is displayed in the content panel in the publication-controlled editing mode:

receiving, from a third user, a third edit to the document; and causing the document to be displayed to the second user without the third edit.

4. The method of claim 1, further comprising, while the document is displayed in the content panel in the synchronous editing mode and in response to the first edit including an identifier of a third user, providing a notification to the third user.

5. The method of claim 1, further comprising, in response to receiving a publication request for the document, providing, to a third user, a notification indicating that the document has been edited.

6. The method of claim 1, wherein:

the client computer is a first client computer;

the content panel is a first content panel;

causing the document to be displayed to the second user without the second edit comprises causing the document to be displayed in a second content panel of a second client computer; and the method further comprises, while the document is displayed in the first content panel in the publication-controlled editing mode, receiving a selection from the second user to edit the document in the publication-controlled editing mode; and in response to receiving the selection from the second user to edit the document in the publication-controlled editing mode:

causing the document to be displayed in the second content panel in the publication-controlled editing mode; and causing the document with the second edit to be displayed to the second user.

7. The method of claim 6, further comprising, while the document is displayed in the second content panel in the publication-controlled editing mode:

receiving, from the second user, a third edit to the document; and causing the document with the third edit to be displayed, in real time, to the first user.

8. A method comprising, in a content collaboration system comprising a plurality of user-generated documents:

causing a client computer to display a graphical user interface including:

a content panel configured to display a selected document in a publication-controlled editing mode and in a synchronous editing mode; and a navigational panel including a hierarchical element tree, the hierarchical element tree comprising a plurality of hierarchically arranged selectable elements, each respective selectable element being selectable to cause display of a respective document associated with the respective selectable element in the content panel;

in response to a selection, from a first user, of a selectable element in the hierarchical element tree, causing a document to be displayed in the content panel in a synchronous editing mode in which:

the document is editable by the first user and a second user;

edits from the first user are visible, in real time, to the second user; and edits from the second user are visible, in real time, to the first user;

in response to receiving, from the first user, a request to edit the document in the publication-controlled editing mode, causing the document to be displayed in the content panel in the publication-controlled editing mode in which:

the document is editable by the first user; and edits from the first user are not visible to the second user until after a publication request is received from the first user; and in response to receiving the publication request from the first user, the edits from the first user are visible to the second user.

9. The method of claim 8, further comprising, in response to receiving the publication request, providing, to a third user, a notification indicating that the document has been edited.

10. The method of claim 9, wherein:

the notification is a first notification; and the method further comprises, in response to receiving a first edit from the first user while the document is displayed in the synchronous editing mode, the first edit including a user identifier of a fourth user, providing a second notification to the fourth user.

11. The method of claim 9, wherein:

the notification is a first notification; and the method further comprises:

receiving a first edit from the first user while the document is displayed in the synchronous editing mode; and after a predetermined time period since receiving the first edit, providing, to the third user, a second notification indicating that the document has been edited.

12. The method of claim 8, wherein the synchronous editing mode is a default editing mode for documents in the content collaboration system.

13. The method of claim 8, wherein:

the client computer is a first client computer;

the content panel is a first content panel;

the method further comprises, while the document is displayed in the first content panel in the publication-controlled editing mode and prior to receiving the publication request, receiving a selection from the second user to edit the document in the publication-controlled editing mode; and in response to receiving the selection from the second user to edit the document in the publication-controlled editing mode:

causing the document to be displayed to the second user in a second content panel of a second client computer in the publication-controlled editing mode; and causing the document with edits from the first user to be displayed to the second user.

14. The method of claim 8, wherein, in the publication-controlled editing mode:

the document is editable by a plurality of additional users;

edits from the first user and from the plurality of additional users are visible, in real time, to the first user and to the plurality of additional users; and the edits from the first user and from the plurality of additional users are not visible to the second user until after the publication request is received from the first user.

15. A computer system comprising:

at least one processor; and at least one memory storing instructions, which when executed by the at least one processor, cause the at least one processor to perform operations comprising:

causing a client computer to display a graphical user interface including:

a content panel configured to display a selected document in a publication-controlled editing mode and in a synchronous editing mode; and a navigational panel including a hierarchical element tree, the hierarchical element tree comprising a plurality of hierarchically arranged selectable elements, each respective selectable element being selectable to cause display of a respective document associated with the respective selectable element in the content panel;

in response to a selection, from a first user, of a selectable element in the hierarchical element tree, causing a document to be displayed in the content panel in the synchronous editing mode in which;

the document is editable by the first user and a second user;

edits from the first user are visible, in real time, to the second user;

edits from the second user are visible, in real time, to the first user; and while the document is displayed in the content panel in the synchronous editing mode and in response to receiving, from the first user, a first edit to the document, causing the document with the first edit to be displayed, in real time, to the second user; and in response to receiving, from the first user, a request to edit the document in the publication-controlled editing mode, causing the document to be displayed in the content panel in the publication-controlled editing mode; and while the document is displayed in the content panel in the publication-controlled editing mode:

receiving, from the first user, a second edit to the document; and causing the document to be displayed to the second user without the second edit, wherein edits from the first user are not visible to the second user until after a publication request is received from the first user.

16. The computer system of claim 15, the operations further comprising:

while the document is displayed in the content panel in the publication-controlled editing mode, receiving a publication request from the first user; and in response to receiving the publication request, causing the document with the first edit to be displayed to the second user.

17. The computer system of claim 15, the operations further comprising, while the document is displayed in the content panel in the publication-controlled editing mode:

receiving, from a third user, a third edit to the document; and causing the document to be displayed to the second user without the third edit.

18. The computer system of claim 15, the operations further comprising, while the document is displayed in the content panel in the synchronous editing mode and in response to the first edit including an identifier of a third user, providing a notification to the third user.

19. The computer system of claim 15, the operations further comprising, in response to receiving a publication request for the document, providing, to a third user, a notification indicating that the document has been edited.

20. The computer system of claim 15, wherein:

the client computer is a first client computer;

the content panel is a first content panel;

causing the document to be displayed to the second user without the second edit comprises causing the document to be displayed in a second content panel of a second client computer; and the operations further comprise, while the document is displayed in the first content panel in the publication-controlled editing mode, receiving a selection from the second user to edit the document in the publication-controlled editing mode; and in response to receiving the selection from the second user to edit the document in the publication-controlled editing mode:

causing the document to be displayed in the second content panel in the publication-controlled editing mode; and causing the document with the second edit to be displayed to the second user.

\* \* \* \* \*